M. MARCH.
BAKER'S OVEN.
APPLICATION FILED NOV. 11, 1914.
1,146,587.
Patented July 13, 1915.
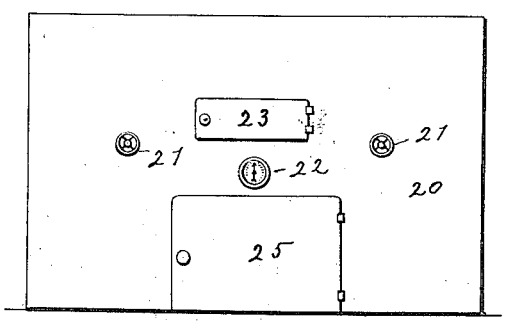
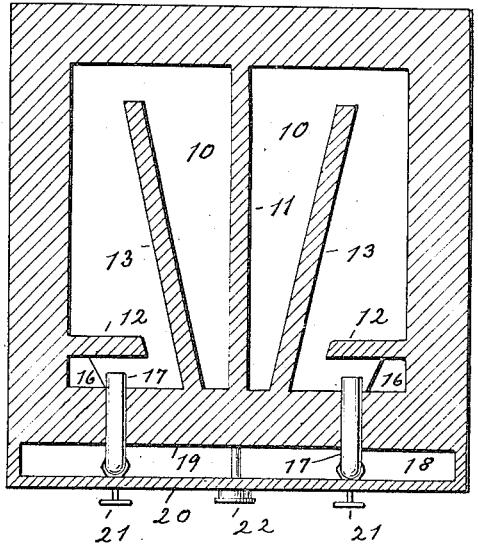
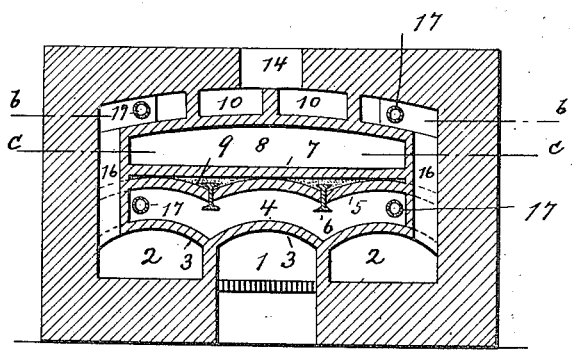
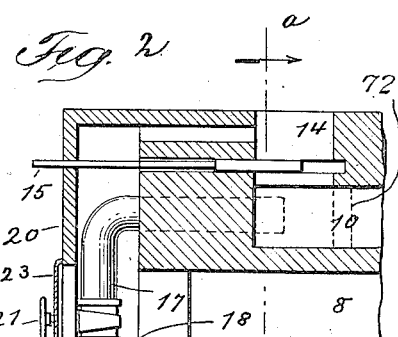
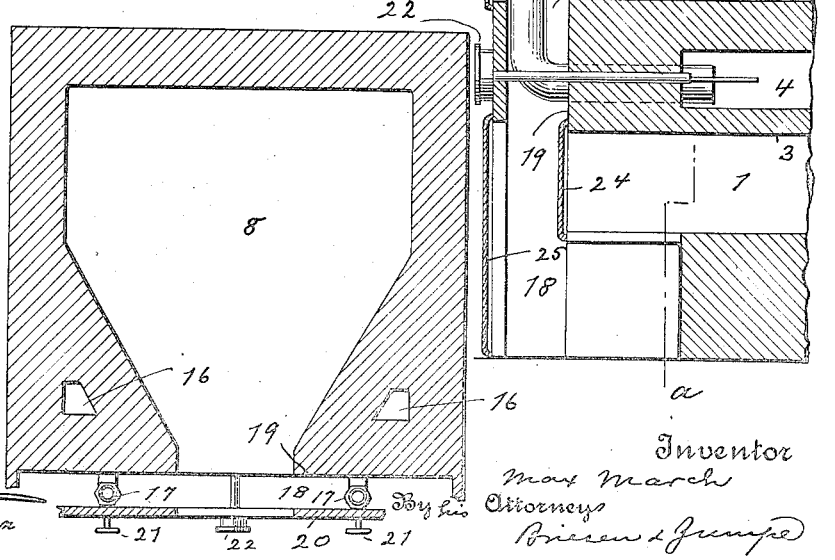

UNITED STATES PATENT OFFICE.

MAX MARCH, OF JERSEY CITY HEIGHTS, NEW JERSEY, ASSIGNOR TO THE GENERAL OVEN COMPANY, INC., OF NEW YORK, N. Y., A CORPORATION.

BAKER'S OVEN.

1,146,587.   Specification of Letters Patent.   Patented July 13, 1915.

Application filed November 11, 1914. Serial No. 871,460.

*To all whom it may concern:*

Be it known that I, MAX MARCH, a citizen of Germany, and residing in Jersey City Heights, in the county of Hudson and State of New Jersey, have invented certain new and useful Improvements in Bakers' Ovens, of which the following is a specification.

This invention relates to a baker's oven of the type known as "Dührkoop oven", and characterized by the interposition of a dead air chamber between the fire chamber and the baking chamber, by means of which the heat is transmitted in a uniform manner to the latter. By my invention, the heat within this air chamber may be readily controlled, and any excessive heat may be carried off and conveyed to the upper heating chamber located above the baking chamber, so as to supplement the heat which is received by said upper heating chamber directly from the fire-chamber.

In the accompanying drawing: Figure 1 is a front elevation of a baker's oven embodying my invention; Fig. 2 a vertical longitudinal section through part thereof. Fig. 3 a cross section on line *a—a* Fig. 2; Fig. 4 a horizontal section on line *b—b* Fig. 3 and Fig. 5 a horizontal section on line *c—c* Fig. 3.

With the embodiment of the invention illustrated, the oven is provided with a front fire chamber 1, and with a pair of horizontal flues 2 communicating therewith and forming part thereof. With ovens having a rear fire chamber, the side flues 2 are generally omitted, the fire chamber extending in that case through the entire width of the oven. The top of the fire chamber (in which term are included the flues 2) is formed by a number of arches 3, and directly above said arches is formed a dead air chamber 4, which is roofed by a number of arches 5, supported upon girders 6. The arches in turn support the floor 7 of the baking chamber 8, a concrete filling 9, closing up the gaps between the arches and the floor, so as to form a continuous level foundation for the latter. Over baking chamber 8, extends an upper heating chamber 10, that furnishes the top heat, and is shown to be divided into two compartments by a longitudinal partition 11. Within each compartment is formed a baffle 12 and an inclined partition 13, which directs the heat to a flue 14 leading to the chimney, and controlled by a damper 15. In order to directly carry the heat from the fire chamber to the upper heating chamber, there are provided a pair of upright flues 16 that extend along the corners of the oven and connect the horizontal flues 2 of the former to points within the baffles 12 of the latter. Means are provided for likewise establishing direct communication between the dead air chamber 4 and the upper heating chamber 10. These means consist of a pair of U shaped metal pipes 17, which are located in an air jacket 18, formed between an inner front oven wall 19, and an outer front oven wall 20. Each pipe 17 is vertically disposed and extends with its lower leg through inner wall 19 into dead air chamber 4, while its upper leg extends through wall 19 into upper heating chamber 10. In order to regulate the heat carried through pipe 17, it is provided with a valve 21 the spindle of which extends outwardly through wall 20, so as to be operable by means of its handle. By the construction described, the pipes 17 are securely mounted in position, do not take up useful space, are entirely concealed from view, and will not radiate the heat into the bakery. 22 is a gage for indicating the degree of heat within the dead air space 4; 23 is the oven door; 24 the fire door, and 25 the ash pit door.

As is well known, an oven of the character described, transmits the heat from the fire chamber to the bottom of the baking chamber, not directly, or by means of flowing air currents, but by means of the body of air contained in chamber 4, and which constitutes an excellent means for heating the baking chamber in a thoroughly uniform manner. But it frequently happens, especially while firing, that the air in chamber 4 is heated excessively and in that case valves 21 are opened to carry the superfluous and in fact objectionable heat through pipes 17 into the upper heating chamber 10. Thus there is furnished additional top heat, which is frequently faulty, because especially during firing the top heat is weaker than the bottom heat. After the proper or normal temperature has been established, the valves are closed, so that the dead air space is again entirely cut off. The valves are of course also operated, whenever during baking operation the gage indicates an excessive heat in the dead air space which would tend to spoil the baking. Of course the air in chamber 4 when highly heated is expanded and placed under such pressure, that upon opening valves 21, it will rise through pipes 17 and enter upper heating chamber 10. Should the heat at one side of the oven exceed the heat at the other side, a circulation of air will take place through chamber 10 pipes 17 and chamber 4. When the oven is not fired and the valves are opened, a normal air pressure will be reëstablished in all of its parts.

I claim:

1. A baker's oven having a fire chamber, a baking chamber, a lower air chamber located between fire chamber and baking chamber, an upper heating chamber above the baking chamber, and a valve-controlled pipe that establishes communication between the lower air chamber and the upper heating chamber.

2. A baker's oven having a fire chamber, a baking chamber, a lower air chamber located between fire chamber and baking chamber, an upper heating chamber above the baking chamber, an inner front wall, an outer front wall, an intervening air jacket, and an upright U shaped pipe located within said jacket, and extending with its lower leg through the inner front wall into the lower air chamber, and with its upper leg through said inner front wall into the upper heating chamber.

3. A baker's oven having a fire chamber, a baking chamber, a lower air chamber located between fire chamber and baking chamber, an upper heating chamber located above the baking chamber, flues that connect the fire chamber with the upper heating chamber, and valve-controlled pipes that connect the lower air chamber with the upper heating chamber.

MAX MARCH.

Witnesses:
 MORRIS W. JACOBI,
 FRANK V. BRIESEN.